3,060,129
METHOD OF INCREASING THE LIGHT OUTPUT OF ALKALINE EARTH HALOPHOSPHATES
Age Hylke Hoekstra and Willem Lambertus Wanmaker, Eindhoven, Netherlands, assignors to North American Philips Company, Inc., New York, N.Y., a corporation of Delaware
No Drawing. Filed July 29, 1960, Ser. No. 46,084
Claims priority, application Netherlands Aug. 7, 1959
5 Claims. (Cl. 252—301.4)

Luminescent alkaline earth halophosphates, activated with trivalent antimony or with trivalent antimony and bivalent manganese are frequently used in combination with gas discharge lamps, for example low pressure mercury vapour discharge lamps. As is known, an alkaline earth halophosphate, activated with trivalent antimony only gives a blue luminescence and an alkaline earth halophosphate activated both with trivalent antimony and with bivalent manganese gives a luminescence extending over a large part of the visible spectrum. The intensity at the various wave lengths is somewhat dependent on the halogen used. Use is frequently made of the combination of the halogens fluorine and chlorine in a ratio of about 1:8.

Of extreme importance in the above luminescent substances naturally is the overall light output, i.e. the number of lumens per watt which can be obtained from these substances on excitation by the ultraviolet radiation of a gas discharge. This light output has already been raised to a very high extent, but economically it is very attractive to further increase the light output even if the increase should amount to only some lumens per watt.

Some methods are already known, with which some lumens per watt can be gained by a final treatment of alkaline earth halophosphates, so of the products which have already a high light output. It has been proposed for example to wash the halophosphates with hydrochloric acid, sulphuric acid or nitric acid.

The object of the method according to the invention also is to increase the light output of the luminescent alkaline earth halophosphates by means of a final treatment.

The method according to the invention for increasing the light output of alkaline earth halophosphate activated with trivalent antimony or with trivalent antimony and bivalent manganese is characterized in that the alkaline earth halophosphate is first washed with an aqueous solution of an inorganic reducing acid having a pH between 0.9 and 2.0 and is further subjected to a treatment for removing particles having a grain size smaller than approximately 2 mircons and to a rinsing with water until practically no reducing acid can any longer be demonstrated in the rinsing water.

As is known, alkaline earth halophosphates are prepared by mixing a number of starting substances and heating at high temperature, usually between 900° C. and 1200° C. at which temperature the desired luminescent phase having an apatite structure is formed.

In addition to the desired luminescent phase, various substances occur in the fired product which are to be considered undesired because they have an inactive absorption of the ultraviolet radiation of the gas discharge lamps in which they are employed. For example, in most of the cases a part of the starting substances, albeit a very small part remains. In addition, calcium pyrophosphate is formed, while also sometimes oxides of manganese and antimony are present. In many cases, in the very substances that are to be considered undesired, the manganese and the antimony are present with a valency higher than 2 and 3 respectively. These manganese and antimony compounds have a disturbing effect because they are coloured. The appearance of a luminescent layer which is formed from the substances consequently is grey.

It has appeared that a large part of the above undesired substances have a very small grain size and are adhered to the surface of the desired grains after firing. It is clear that the removal of these accretions gives a chance of a product having a better light output. This removal consequently was the purpose of the known processes in which washings are carried out with hydrochloric acid, sulphuric acid or nitric acid. During washing several reactions take place. For example, the desired phase having the apatite structure dissolves somewhat. This dissolving naturally occurs on the outside of the grains, as a result of which also the accretions are dissociated from the grains. These accretions are partly soluble in the acid and can consequently be removed by simply filtering. (By filtering is to be understood here and in the below description any process with which a fluid and a solid, also the finest particles thereof can be separated practically completely.) A part of the dissociated accretions is insoluble. On filtering, these accretions consequently remain mixed with the desired luminescent substance. Just because these accretions have a grain size smaller than approximately 2 microns, they are particularly disturbing when using the luminescent substances in a gas discharge lamp. As a result of the normal method of applying the luminescent layers in such lamps, the fine particles are concentrated on the side of the discharge. Since they have an inactive absorption of the ultraviolet radiation, the luminescent grains having the correct apatite structure are excited by a small quantity of ultraviolet rays. So it is insufficient to wash with a strong acid and then filter as described in the above publications. Therefore, according to the invention a process is applied after washing with acid such that the particles having a grain size smaller than approximately 2 microns are removed.

In the known methods washing is carried out with a strong acid such as the above described hydrochloric acid, sulphuric acid or nitric acid. In itself washing with a strong acid is already undesired because with such an acid too large a part of the desired luminescent phase easily dissolves. However, still other objections are attached to the three above-mentioned acids. For, by dissolving, bivalent manganese and trivalent antimony are dissociated from the crystal lattice of the desired phase. If the acid with which washing is carried out is an oxidizing acid, for example nitric acid and sulphuric acid, higher valent manganese and antimony compounds are formed which again form grey precipitates on the halophosphate grains.

When washing with hydrochloric acid, so with a non-oxidizing acid, no direct oxidation takes place. All the same, the washing with hydrochloric acid does not yield bright white grains either. This may be explained as follows.

After washing with acid, filtration has to be carried out to remove the dissolved compounds. After filtering, for example by centrifugation, the remaining solid has to be rinsed with water, as usual, to remove the acid wash liquid. During this rinsing the pH of the wet mass naturally increases. If the pH exceeds the value 5, it appears that oxidation of the bivalent manganese compounds and trivalent antimony compounds may take place by atmospheric oxygen. As a result of this there is again the danger of a grey precipitate on the desired grains.

According to the invention, the washing is carried out with an inorganic reducing acid, preferably sulphurous acid or phosphorous acid. As a result of this, no direct oxidation of bivalent manganese or trivalent antimony, possibly dissociated from the crystal lattice, can then take place and since reducing acid is invariably present when rinsing the product on the filter with water, oxidation by atmospheric oxygen is also prevented when exceeding the pH value 5.

The removal of the insoluble particles having a grain size smaller than approximately 2 microns should naturally take place after the washing with the inorganic reducing acid. It is of little importance in what phase of the final treatment after washing this removal takes place. For example, the small particles may immediately be removed from the suspension of the halophosphate and the inorganic reducing acid. However, it is also possible first to remove the inorganic reducing acid by rinsing and then removing the small particles.

It is of particular advantage to carry out the removal of the particles having a grain size smaller than approximately 2 microns by means of a hydrocyclone. For that purpose it is necessary that the mass from which the small particles are to be removed, is suspended. The suspension medium may be for example pure water or water still containing inorganic reducing acid.

When using sulphurous acid for washing, sometimes a precipitate of calcium sulphite is formed on the grains of the desired luminescent phase. This sulphite decomposes when evacuating the gas discharge lamps and then gives off sulphur dioxide which results in a bad lumen maintenance. Since the sulphite is poorly water-soluble, it cannot be removed sufficiently by rinsing with water. If, however, a small quantity of acid, for example hydrochloric acid, is added to the rinsing water, so that the pH lies between 2.0 and 2.5, the calcium sulphite dissolves and can consequently be removed by rinsing. However, care should be taken that not too much acid is used since otherwise again alkaline earth halophosphate of the desired apatite structure dissolves. Therefore, the rinsing is carried out with a quantity of acid such as is required and sufficient to dissolve the calcium sulphite formed.

The removal of the particles having a grain size smaller than approximately 2 microns may also be carried out after the dissolving of the calcium sulphite.

The method according to the invention results in products which, when used in gas discharge lamps, immediately have a higher light output and/or better lumen maintenance substances which have not been subjected to the final treatment or have been obtained with the known methods. As is known, the lumen output drops inevitably after a certain number of hours in operation. Particularly in the first 100 hours, the decline is rather strong.

In order that the invention may be readily carried into effect, it will now be described in greater retail, by way of example, with reference to the following examples.

*Final Treatment With Sulphurous Acid and Hydrochloric Acid*

(a) 1500 gms. of calcium halophosphate are suspended in 1.4 l. of water after which 0.1 l. of water saturated with $SO_2$ is added. The resulting suspension is stirred vigorously for 3–4 hours. Subsequently the suspension is sucked off on a filter and the filter cake is rinsed with 1–2 l. of water until practically no $SO_2$ can be demonstrated any longer in the rinsing water. Then the filter cake is rinsed with 4 l. of water to which 5 ml. of 6 normal HCl is added. Subsequently there is rinsed again with 5 l. of water. The filter cake is suspended in water and passed through a hydrocyclone with which particles having a grain size smaller than approximately 2 microns can be removed. The suspension leaving the hydrocyclone and containing the coarser particles is filtered. The filter cake is dried and pulverized. The resulting substance is then ready for application in gas discharge lamps.

(b) 1500 gms. of calcium halophosphate are suspended in 1.4 l. of water after which 0.1 l. of water saturated with $SO_2$ is added. The suspension is stirred vigorously for 3–4 hours and then sucked off on a filter. The filter cake is then washed with 6 l. of water to which 6 ml. of 6 normal HCl has been added. Subsequently there is rinsed with 5 l. of water. The cake is then suspended in a quantity of water and passed through a hydrocyclone with which particles having a grain size smaller than approximately 2 microns can be separated. The suspension leaving the hydrocyclone and containing the coarser particles is filtered. The filter cake is dried and pulverized. The resulting dry substance is then ready for application in gas discharge lamps.

*Final Treatment With Phosphorous Acid*

1500 gms. of calcium halophosphate are brought into 1.5 l. of water and 30 gms. of $H_3PO_3$ are added to the suspension which is stirred vigorously for approximately 4 hours. Then the suspension is passed through a hydrocyclone with which particles having a grain size smaller than 2 microns can be separated. The part of the suspension leaving the hydrocyclone and containing the coarser particles is filtered. The filter cake is then rinsed with 1–2 l. of water until no phosphorous acid can be demonstrated any longer in the rinsing water. Then the filter cake is dried and pulverized, the desired luminescent substance suitable for use in discharge lamps being obtained.

The following table summarizes the average light output for various methods of final treatment of a number of different samples of calcium halophosphate when used in gas discharge lamps. The first column of the table indicates the method of treatment. In the following columns are indicated the useful life at 0 hour, the useful life in 100 hours of the light output and the drop in lumen output. The useful life at 0 hour is the light output which is measured right after completion of the lamp. The useful life in 100 hours is the light output after the lamp has operated 100 hours. The light output is measured, after the formation of a layer of powder in a low pressure mercury vapor discharge tube, with respect to a standard lamp, the light output of which has been put at 100.

| Final treatment with— | Calcium halophosphate activated with manganese and antimony | | | Calcium halophosphate activated with antimony | | |
|---|---|---|---|---|---|---|
| | Lumen output at 0 hours | Lumen output at 100 hours | Lumen output drop | Lumen output at 0 hours | Lumen output at 100 hours | Lumen output drop |
| none | 74.5 | 72.3 | 2.2 | 49.5 | 48.5 | 1.0 |
| HCl | 75.5 | 73.0 | 2.5 | 49.3 | 47.9 | 1.4 |
| $SO_2$ | 76.2 | 73.5 | 2.7 | 50.4 | 48.8 | 1.6 |
| $SO_2$+HCl | 76.5 | 74.5 | 2.0 | 49.7 | 48.6 | 1.1 |
| $H_3PO_3$ | 76.0 | 73.8 | 2.2 | 50.2 | 49.9 | 0.3 |

What is claimed is:

1. A method of increasing the light output of alkaline earth halophosphate activated with a member of the group consisting of trivalent antimony, trivalent antimony and bivalent manganese, wherein the alkaline earth halophosphate is first washed with an aqueous solution of an inorganic reducing acid having a pH between 0.9 and 2.0 and is then subjected to a process for removing particles having a grain size smaller than approximately 2 microns and to a rinsing with water until practically no reducing acid is present any longer in the rinsing water.

2. The method of claim 1, wherein phosphorous acid is used as the inorganic reducing acid.

3. The method of claim 1, wherein sulphurous acid is used as the inorganic reducing acid.

4. The method of claim 3, wherein rinsing is carried out with so much dilute hydrochloric acid, having a pH between 2.0 and 2.5, as is required to dissolve any calcium sulphite formed during washing and that subsequently rinsing is carried out with water to remove the hydrochloric acid.

5. The method of claim 1, wherein the removal of the particles having a grain size smaller than approximately 2 microns is carried out by centrifugal means.

References Cited in the file of this patent

UNITED STATES PATENTS

| | | |
|---|---|---|
| 2,164,533 | Leverenz | July 4, 1939 |
| 2,752,313 | Wollentin | June 26, 1956 |
| 2,772,241 | Ranby | Nov. 27, 1956 |
| 2,946,656 | Schreurs | July 26, 1960 |